US007027613B2

(12) United States Patent
Spierenburg

(10) Patent No.: US 7,027,613 B2
(45) Date of Patent: Apr. 11, 2006

(54) DIGITAL SECURITY IMAGE PROVIDED WITH DOUBLE-BANDED CODING

(75) Inventor: Joost Alexander Spierenburg, Oegstgeest (NL)

(73) Assignee: Koninklijke Joh. Enschede B.V., Haarlem (NL)

( * ) Notice: Subject to any disclaimer, the term of this patent is extended or adjusted under 35 U.S.C. 154(b) by 109 days.

(21) Appl. No.: 10/616,903

(22) Filed: Jul. 10, 2003

(65) Prior Publication Data

US 2004/0252860 A1 Dec. 16, 2004

Related U.S. Application Data

(63) Continuation of application No. PCT/NL02/00050, filed on Jan. 23, 2002.

(30) Foreign Application Priority Data

Jan. 23, 2001 (NL) .................................... 1017173

(51) Int. Cl.
*G06K 9/00* (2006.01)

(52) U.S. Cl. ........................................ 382/100; 283/72

(58) Field of Classification Search ................ 382/100, 382/135, 137; 380/51, 54, 55; 356/71; 340/5.86; 399/366; 283/72, 74, 901, 902
See application file for complete search history.

(56) References Cited

U.S. PATENT DOCUMENTS 4,146,792 A 3/1979 Stenzel et al. .............. 250/365
4,210,346 A 7/1980 Mowry, Jr. et al. ......... 283/8 B
5,530,772 A * 6/1996 Storey ........................ 382/135
5,904,375 A * 5/1999 Brugada ...................... 283/85
6,108,512 A * 8/2000 Hanna ........................ 399/366
6,574,350 B1 * 6/2003 Rhoads et al. .............. 382/100

FOREIGN PATENT DOCUMENTS

| | | | | |
|---|---|---|---|---|
| EP | 0691632 | A1 | | 1/1996 |
| EP | 1122939 | A2 | | 8/2001 |
| GB | 2346110 | A | | 8/2000 |
| NL | 9201701 | A | | 5/1994 |
| WO | WO 95/27627 | A1 | * | 10/1995 |
| WO | WO 99/36876 | A2 | * | 7/1999 |

* cited by examiner

*Primary Examiner*—Andrew W. Johns
(74) *Attorney, Agent, or Firm*—Ladas & Parry LLP

(57) ABSTRACT

The invention relates to a digital security image, to be arranged on or in carrier, particularly a document, such as bonds or other documents the authenticity or origin of which is of importance, and having at least a first and second security characteristic visually almost imperceptibly incorporated in the digital security image, wherein the first security characteristic is detectably copied on a copy when copying the document and the second security characteristic is not copied onto said copy when copying the document, as well as a method for arranging and for detecting such a security element, as well as equipment for it. Additionally the invention relates to an image and an image in electronic form, provided with the security element according to the invention.

23 Claims, 19 Drawing Sheets

DIGITAL SECURITY IMAGE PROVIDED WITH DOUBLE-BANDED CODING

This application is a continuation of App. No. PCT/NL02/00050, filed Jan. 23, 2002.

BACKGROUND OF THE INVENTION

The invention relates to a digital security image, to be arranged on a carrier, particularly a document, such as bonds or other documents the authenticity or origin of which is of importance.

In practice it is for instance common to provide a document that may or may not be provided with an image, with a security element against unauthorized copying. Such a security element may for instance be a security image, the security image being incorporated in the image and not or hardly being perceptible to the human eye.

To that end documents were in the past provided with a security characteristic that disappeared from the copy when copying, as a result of which it was detectable whether a document was authentic or a copy with which fraud might have been committed.

Additionally documents were in the past provided with a security characteristic that remained detectably present on the copy when copying. As a result it could be established whether a copy originated from an original or was counterfeit. An example of this is given in NL-A-9201701, in which as a security characteristic a first image invisible to the human eye has been incorporated in second image. Said second image is subsequently applied on a document. When making a photo copy of the document either the second image becomes visible to the eye, or the photocopying machine refuses to print the document.

Even if such characteristics were simultaneously arranged on one document, the various types of images were up until now arranged in different images or at different locations on a document. The drawback of this is that as a result the security characteristics take up a lot of space on a document to be secured. In addition detection of the various characteristics takes place separately. Because detecting the various characteristics often is highly arithmetic, in case it is a characteristic that can be made visible by means of specific image processing techniques, it is in many cases not or hardly possible to carry out the verification real-time, for instance at a check-out in a store. Additionally, verification of large numbers of documents is time-consuming.

An additional problem occurring with the present security elements is that it cannot be indicated whether a non-authentic document is a copy of an original or a complete forgery, particularly not when one security characteristic has been arranged.

SUMMARY OF THE INVENTION

It is an object of the invention to remove the various drawbacks at least partially and to solve problems, and to that end provides a digital security image, to be arranged on or in a carrier, particularly a document, such as bonds or other documents the authenticity or origin of which is of importance, and having at least a first and second security characteristic visually almost imperceptibly incorporated in the digital security image, wherein the first security characteristic is detectably copied on a copy when copying the document and the second security characteristic is not copied onto said copy when copying the document.

By opting for providing a digital security image of at least two security characteristics, the possibility is created to verify both security characteristics in one detection-go. Additionally it is possible to create a document that has several security levels or authorization levels. It can namely be established whether it regards an authentic document (first group), a copy of an authentic document (second group) or a fake. Additionally the digital security image can be arranged in a common printing process.

In this patent application the term resolution is used for the resolving power, therefore the resolution in the physical sense, of recording equipment able to convert a physical image into an electronic format, such as a ϵ scanner or digital photo camera or still video camera or CCD video camera. Additionally the term resolution is used for the so-called dot-pitch of printing or display equipment such as printers. It regards the number of dots such a machine can display per inch or cm.

A carrier according to the invention particularly regards a document the authenticity of which is of importance. The document may be a label arranged to be on a product or incorporated therein, a (e.g., plastic) pass such as a credit card, bank card or pass for other purposes.

An image as used in this application relates to a colour or grayscale photo or drawing, but it may also be a recognisable pattern, which may or may not be regular, or a diagram or another line drawing.

In an embodiment of the invention, the invention regards security characteristics that have been added to an image and that are not or hardly perceptible or recognisable to the human eye. In general this means in the present state of the art that the resolution of the security characteristic is higher than 250 dpi (dots per inch, a common measure to indicate the resolution of printers and scanners). The exact value depends on the colour or colour component of the image and the observation distance. To the human eye this is in the range of 100 dpi at a distance of 30 cm.

The present (colour) copiers generally have a scan/print resolution of 300–600 dpi. The present printing presses or digital presses, particularly for secured printing such as bonds, said printing presses or digital presses may have a resolution of more than 10,000 dpi. According to the sampling theory the original signal can be reconstructed when the sampling frequency is at least twice the signal frequency.

In an embodiment of the invention the first and second security characteristic are incorporated in the digital security image by means of image processing techniques. In an embodiment thereof the first and second security characteristic regard first and second images that have been added in the Fourier frequency domain to the amplitude values of an image. In other words, the security characteristics have been added to the Fourier amplitude spectrum of an original image. To that end one image has been added in a range the frequencies of which are above the visual frequency but below the sampling frequency of for instance a colour copier, the second image in a range above the sampling frequency of for instance a colour copier.

The Fourier amplitude has also been described as the length of a vector, in which the accompanying Fourier phase has been described as the angle of the above-mentioned vector. This therefore illustrates a complex number.

In a further embodiment one image is added as real image in the frequency domain to the Fourier transformed of the original image, whereas of a second image the amplitudes of the Fourier transformed are mirrored or converted in another way into values in a frequency range that exerts as little influence as possible on the values that are already in the frequency domain of the original image and subsequently are added to the amplitude image of the original image. Exerting as little influence as possible here means that in the final image as arranged on a document both images that have been arranged as security characteristic visually cannot or hardly be seen.

An advantage of using the Fourier amplitude spectrum is that there is a direct relation between the value of the amplitude in the Fourier frequency domain and the resolution in the real domain.

In an embodiment the resolution of the security characteristics is higher than the resolving power of the human eye. As a result it is impossible to perceive without an aid that a document has been provided with security elements, and what those security elements are. Additionally the security element can be arranged without being detrimental to the aesthetic quality or functionality of the image. More specifically in a further embodiment the resolution of the security characteristics when arranged is higher than 100 dpi.

It has turned out to be possible to arrange security characteristics that are visually not or hardly perceptible and which solve the above-mentioned problems, by adding the first and second security characteristic to the Fourier amplitude spectrum of the original image.

In a further embodiment the first security characteristic has been added to a first frequency range of the Fourier amplitude spectrum of the original image, and a second security characteristic to a second frequency range of the Fourier spectrum of the original image.

In another or further embodiment of the invention the original image is a colour image. This has the advantage that the security characteristics can be incorporated in one colour component or each in another colour component, for instance in the yellow, cyan or magenta component or one of the RGB components. As a result the security characteristic is visually even more difficult to perceive. In an embodiment thereof the security characteristics have been incorporated in at least one colour component of the original image, specifically it is advantageous when the security characteristics have been incorporated in the same colour component. As a result the security characteristic is easy to detect and easy to render visually imperceptible. For other reasons it may however be desirable to incorporate the various security characteristics in various colour components.

In an embodiment of the invention a first security characteristic has been incorporated in or on a carrier according to the invention in a frequency range of the Fourier amplitude spectrum which has a resolution of approximately 150–600 dpi in the spatial domain and a second security characteristic in a frequency range of the Fourier amplitude spectrum which has a resolution higher than the resolution of the first security characteristic in the spatial domain. The exact value of the resolution of course depends on the possibilities of the copying equipment available on the market at that time. The given values are values that are valid for the present technical possibilities.

To be able to reconstruct a second security characteristic well, it is preferred when also the phase spectrum is added to the phase spectrum of an original image.

Additionally the invention relates to a carrier, particularly a document, provided with at least a first and a second security characteristic on or in substantially the same position on the carrier, in which the first security characteristic and the second security characteristic have a frequency that is higher than visually perceptible to the human eye, in which furthermore the first security characteristic in the Fourier frequency domain has a frequency that is lower than the print and scan resolution of the copying equipment and the second security characteristic in the Fourier frequency domain has a frequency of at least twice the highest of the print and scan resolution of the copying equipment.

In addition the invention relates to a carrier, particularly a document, provided with at least a first and a second security characteristic on or in substantially the same position on the document, in which the first security characteristic in the Fourier domain is in a range which has a frequency of approximately between 150 and 400 dpi, preferably between 250 and 400 dpi, in the spatial domain, and the second security characteristic in the Fourier frequency domain is in a range which has a resolution that is higher than approximately 400 dpi, preferably higher than 800 dpi, in the spatial domain.

In an embodiment the first and second security characteristic have been incorporated in or on the aforementioned carrier in the amplitude spectrum of the Fourier frequency domain. As a result it is simple to almost invisibly arrange the security characteristics.

Additionally the invention relates to a carrier, particularly a document, provided with a secured image, in which the amplitude spectrum of the Fourier transformed of the secured image is an addition sum of the amplitude spectrum of the Fourier transformed of an original image, a first image having frequencies in the amplitude spectrum which have a resolution higher than 150 dpi in the spatial domain and the transformed of the amplitude spectrum of the Fourier transformed of a second image having frequencies in the amplitude spectrum which have a resolution in the spatial domain that is higher than the resolutions of the first image.

In an embodiment the transformation in the above-mentioned carrier is a low-pass filter followed by a transformation which converts the low frequencies into frequencies above a threshold value, the transformations being carried out in the Fourier frequency domain.

In one embodiment thereof one of the security characteristics relates to the “Full-spectrum” characteristic. This characteristic has been elaborately described in “Developments in digital document security”, by S. Spannenburg, Optical Security and Deterrence Techniques III, Volume, 3973, page 88–98. This article is referred to as if fully incorporated into this text.

A second security characteristic which in an embodiment can be incorporated in the same image as the “full-spectrum” security characteristic is the security characteristic indicated by SABIC (Sample Band Image Coding), which is described in WO-A-9527627, which is referred to here as if fully incorporated into this text.

Additionally the invention relates to a method for arranging security elements on a carrier, particularly a document, in which a first security characteristic with a resolution higher than 100 dpi and a second security characteristic with a resolution higher than the resolution of the first security characteristic and higher than a display device is arranged in an original image for obtaining a security image, after which the security image is arranged on the carrier as security characteristic. In connection with the aforementioned sampling theory in an embodiment at least twice as high as the resolution of a display device. Such a display device can be a display screen. In an embodiment, however, it can also be a (colour) copier or a combination of a scanner with printer. In practice the resolution of a printer has up until now been lower than that of image recording equipment such as a scanner. The resolution of the printer will in that case be decisive.

Additionally, the invention relates to method for detecting a security characteristic as outlined above, in which an image is converted into a representation that is computer-processable, software loaded in the computer memory applies a high-passage filter operation and a diode function operation on the representation, and compares the result, for instance by means of a XOR operation, with the computer-processable representation of the first security image, calculates the Fourier transformed of the representation, and compares the amplitude spectrum to the second security image.

In addition the invention relates to a device for detecting the security characteristics in or on a carrier, particularly a document, or an image on a carrier, in which the device has been provided with a recording device for recording an image of the carrier or the image in a computer-processable form, a computer connected to the recording device, means for transmitting the image from the recording device to a computer connected to the recording device, which computer has been provided with a memory, a calculating unit provided with software for calculating the Fourier transformed of the image in the memory, and display means for displaying an assessment of the authenticity of the image or the document.

Additionally the invention relates to an image provided with a first and second security characteristic, suitable as secured image as described above.

Additionally the invention relates to an image in the form of a computer processable form on a digital information carrier or in a computer memory, provided with a first and second security characteristic, suitable as secured image as described above.

In addition the invention relates to software, suitable for arranging and detecting a first and second security characteristic as described above.

The invention additionally relates to a carrier provided with software for operating a computer, suitable for carrying out one of the above-mentioned methods.

Additionally the invention relates to a computer, provided with a memory loaded with software, suitable for carrying out one of the above-mentioned methods.

BRIEF DESCRIPTION OF THE DRAWING

The invention is further elucidated on the basis of an exemplary embodiment according to the invention, in which.

In some cases the figures appear more than once, this however serves clarity.

DESCRIPTION OF EMBODIMENTS

Figure 3:
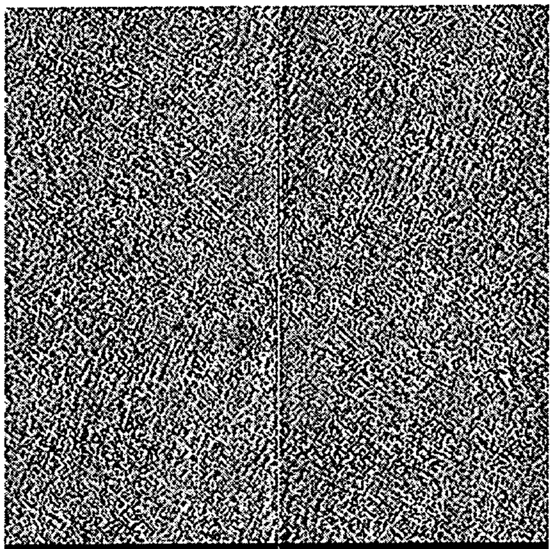
FIG. 3 shows a phase spectrum of the Fourier transformed (FFT) of FIG. 1.
Figure 2:
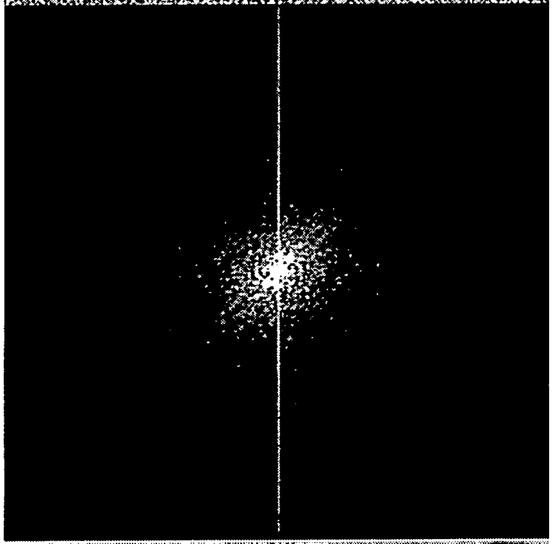
FIG. 2 shows an amplitude spectrum of the Fourier transformed (FFT) of FIG. 1.
Figure 1:
FIG. 1 shows an image to be secured.

FIGS. 1–3 next to each other show an image (FIG. 1) to be secured, a two-dimensional image of the Fourier amplitude spectrum, obtained by applying the Fast Fourier Transform (FFT) algorithm on FIG. 1 (FIG. 2), and a two-dimensional image of the Fourier phase spectrum obtained by applying the FFT algorithm on image 1.

Figure 5:
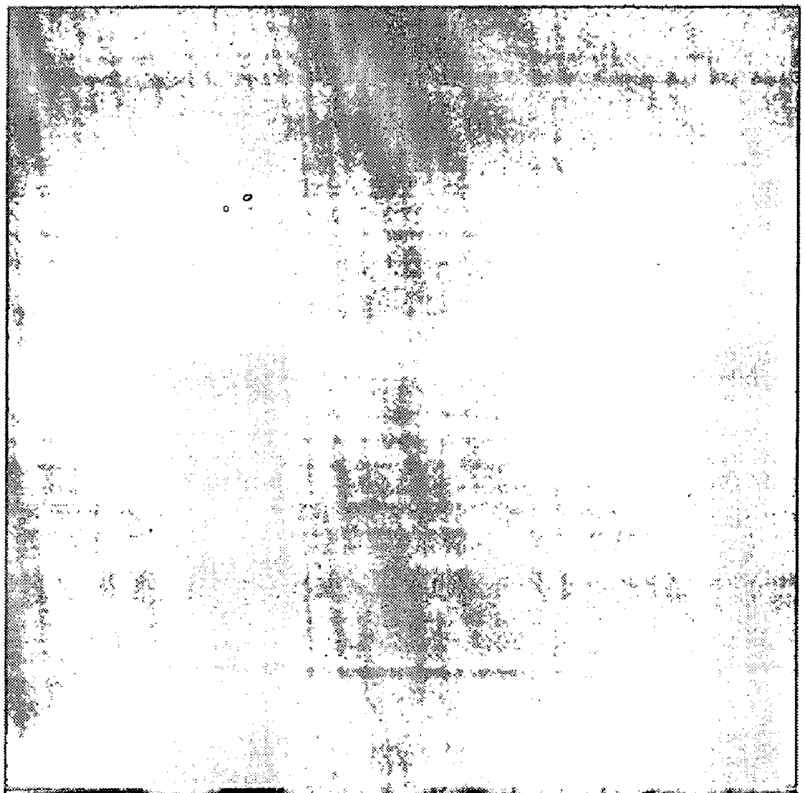
FIG. 5 shows the code image of FIG. 4.
Figure 4:
FIG. 4 shows a second security image.

FIG. 4 shows a second security image, and FIG. 5 shows the edited second security image in a form that can be added to an original image. To that end the Fourier transformed has been calculated, on the amplitude spectrum a low-pass filter has been applied, and subsequently the result has been mirrored, in which each quadrant has been mirrored in a diagonal that divides the quadrant in two, but also other operations with which the low frequencies are converted into high frequencies, such as mirrorings but other processes are also conceivable and applicable. This transformed image has been transformed back by means of Fourier transformation to the spatial domain.

Figure 8:
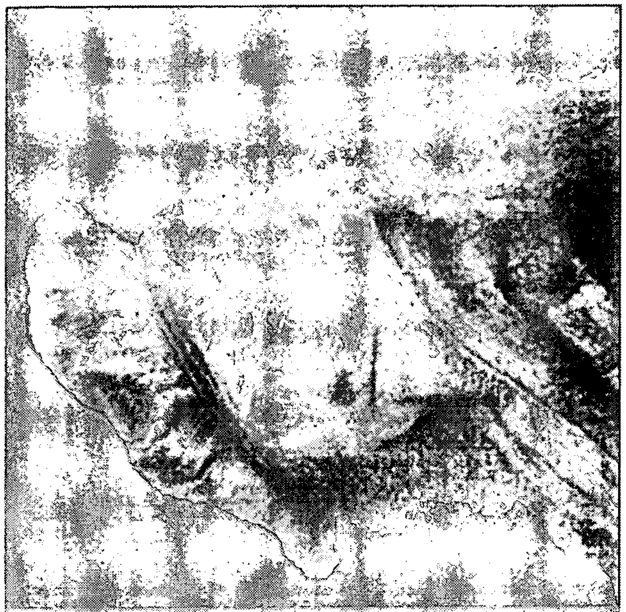
FIG. 8 shows the addition sum of FIGS. 6 and 7.
Figure 7:
FIG. 7 shows the original image.
Figure 6:
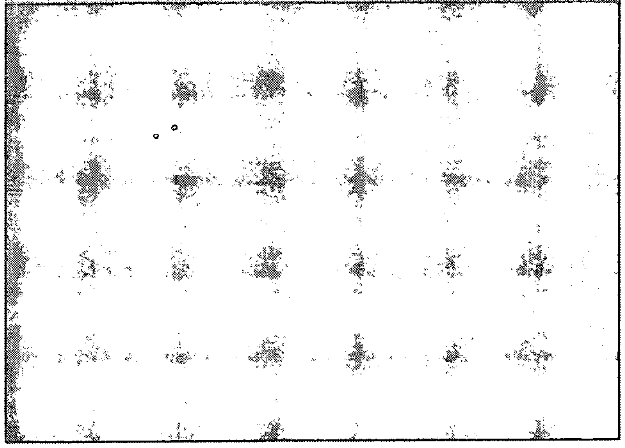
FIG. 6 shows the code image, identical to FIG. 5.

FIGS. 6–8, consecutively show in FIG. 6 the edited image, identical to FIG. 5, in FIG. 7 the original image to be secured identical to FIG. 1, and in FIG. 8 an addition sum of FIGS. 6 and 7.

Figure 11:
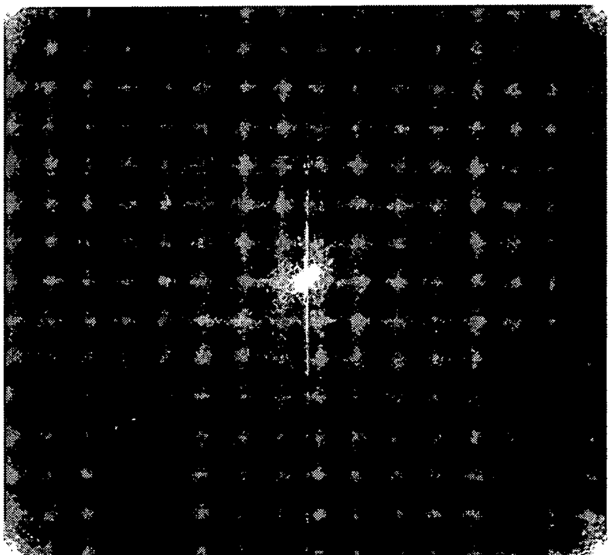
FIG. 11 shows the addition sum of FIGS. 9 and 10.
Figure 10:
FIG. 10 shows the Fourier transformed (FFT) of FIG. 6, mirrored.
Figure 9:
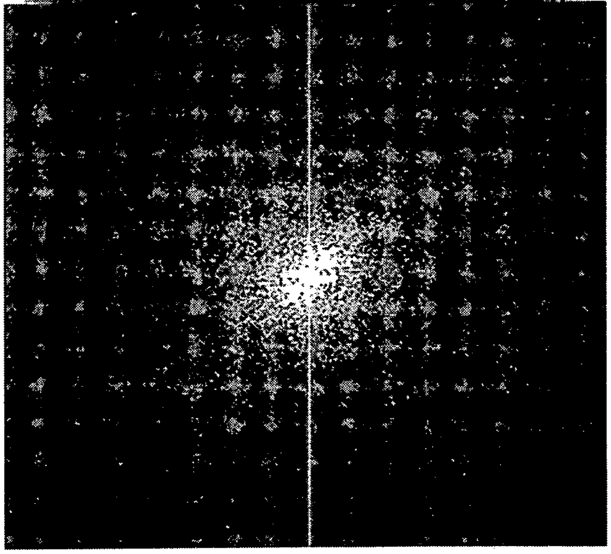
FIG. 9 shows the Fourier transformed. (FFT) of FIG. 7, amplitude indication.

The FIGS. 9–11 consecutively show in FIG. 9 the amplitude spectrum of the Fourier transformed of FIG. 7, in FIG. 10 the amplitude spectrum of the Fourier transformed of FIG. 6 and in FIG. 11 the amplitude spectrum of the Fourier transformed of FIG. 8.

Figure 14:
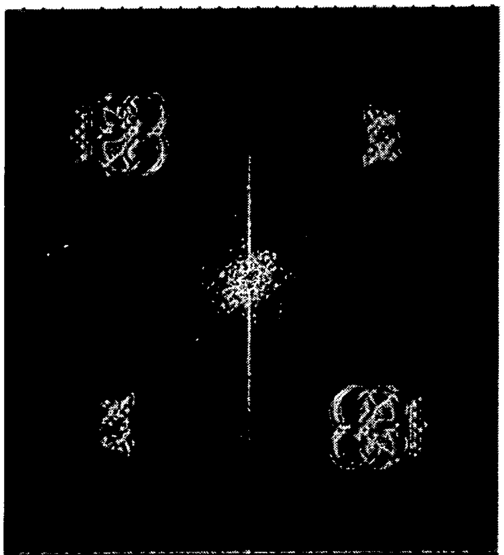
FIG. 14 shows the addition sum of FIGS. 12 and 13.
Figure 13:
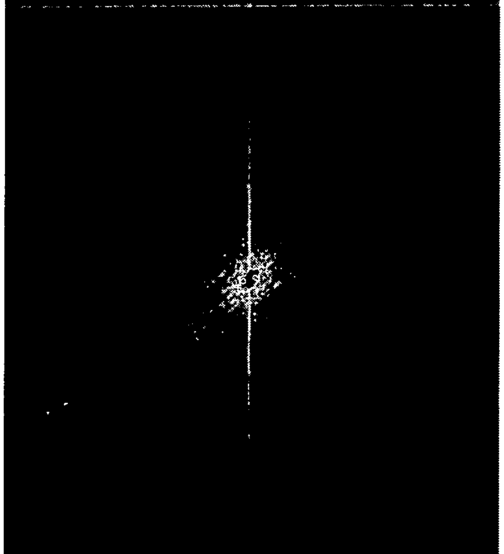
FIG. 13 is identical to FIG. 9.
Figure 12:
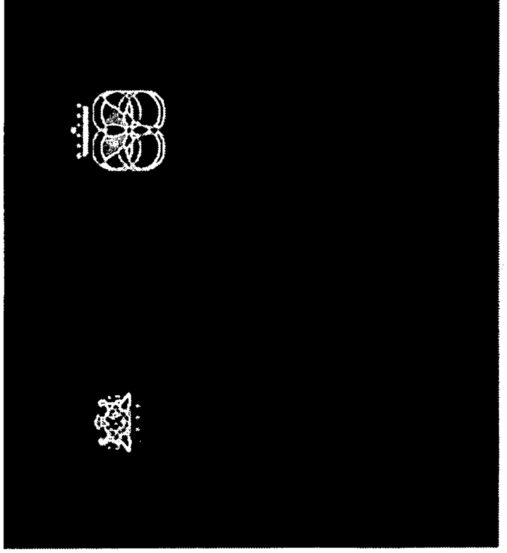
FIG. 12 shows a first security image.
Figure 15:
FIG. 15 is identical to FIGS. 1 and 7.
Figure 16:
FIG. 16 shows the Fourier transformed (FFT) of FIG. 14.

The FIGS. 12–16 first of all show in FIG. 12 a security image, in FIG. 13 the amplitude spectrum of the Fourier transformed of the image to be secured (Rembrandt of FIGS. 1 and 7), and in FIG. 14 the addition sum of FIGS. 12 and 13. In FIG. 15 the original image to be secured is shown again for comparison, and in FIG. 16 the back-transformed of FIG. 14. FIG. 12 has been added to the Fourier amplitude spectrum of FIG. 15. Visually this is hardly perceptible (see FIG. 16).

Figure 17:
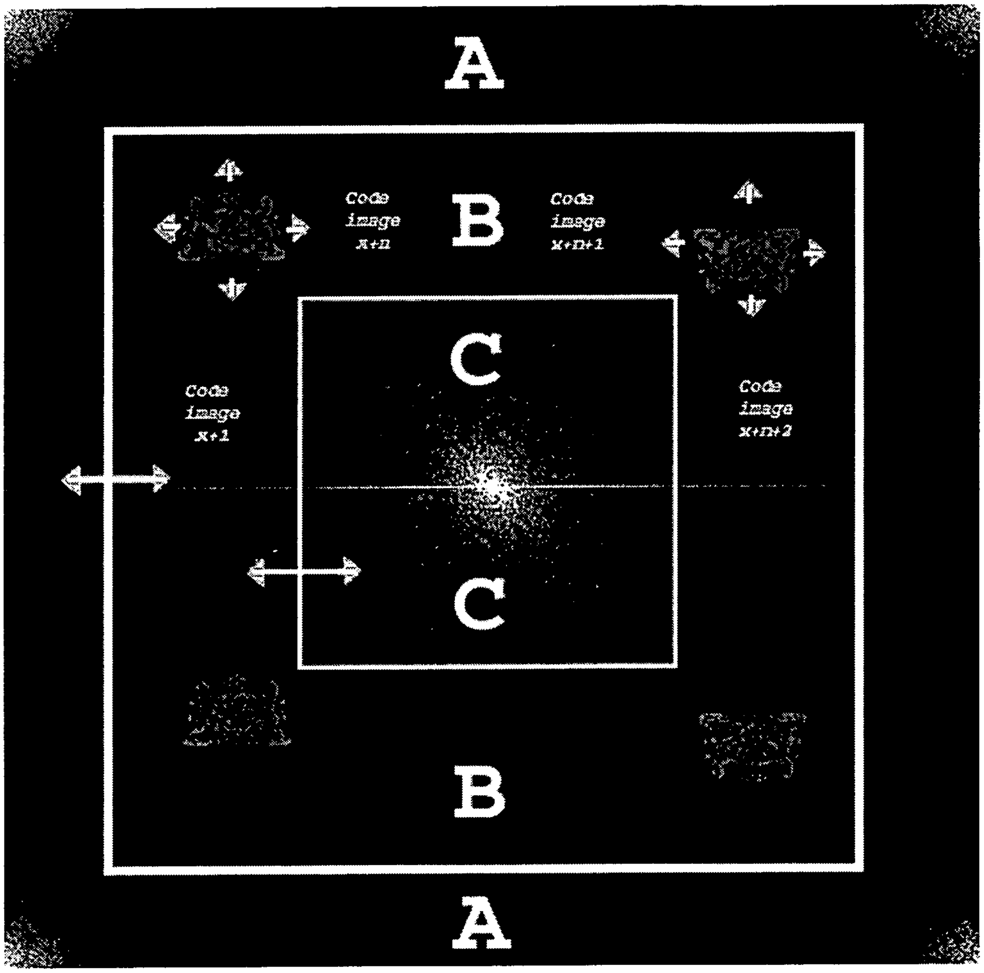
FIG. 17 shows the various amplitude frequency ranges in the Fourier (FFT) spectrum.

In FIG. 17 the principle can be seen of the security element according to the invention. Here the Fourier amplitude spectrum of the original image with first and second security element is shown. The Fourier amplitude spectrum in this case is divided into three areas A, B and C. In area C the main amplitude components of the original image are present. In frequency area B a first security element has been arranged. The frequency is such that the security element is preserved when copying by means of an ordinary (possibly colour) copier. In frequency area A, a second security element has been arranged of such a frequency that the information when copying by means of a ordinary (possibly colour) copier will get lost. In the figure it is indicated that the limits of the areas can be selected. It is even possible to define several areas, for instance in such a way that areas are created in which the image is no longer visible in a copy of a copy, and so on.

In the FIGS. 18–26 the figures already shown are shown again, but now enlarged as a result of which the details are better visible.

Figure 18:
FIG. 18 shows an original image to be secured.
Figure 19:
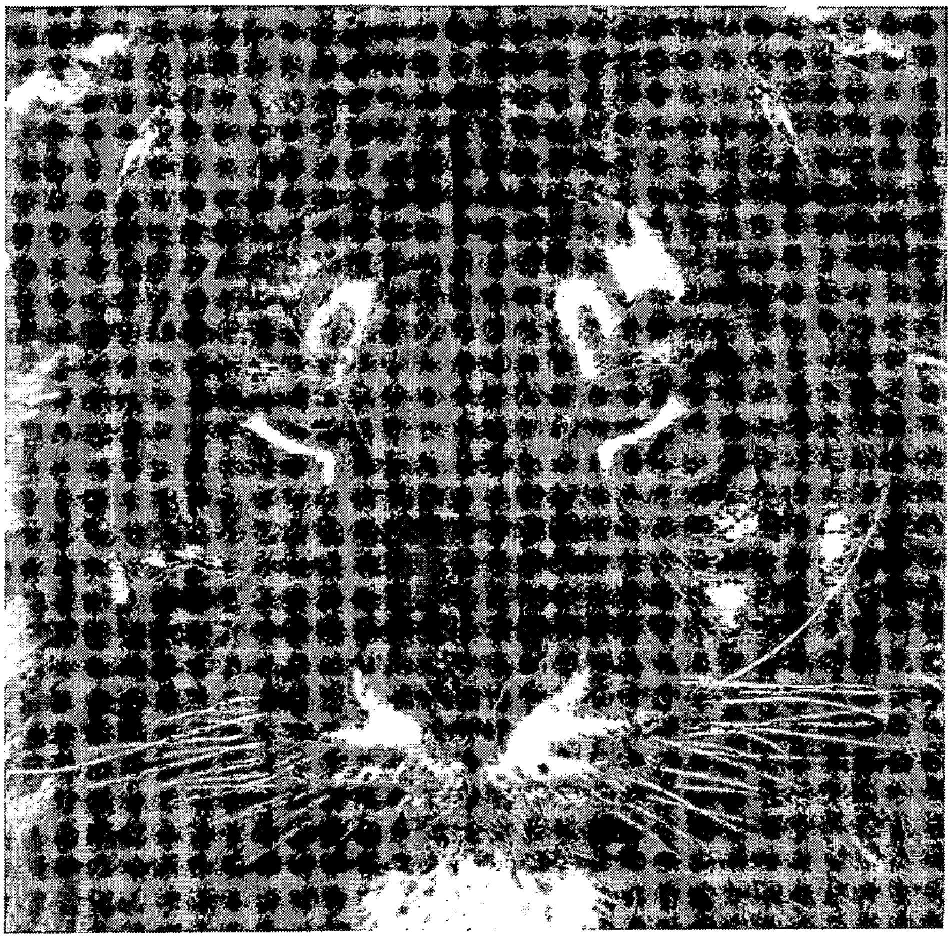
FIG. 19 shows a second security image to be used.
Figure 20:
FIG. 20 shows FIG. 18 provided with a second security image.
Figure 21:
FIG. 21 shows the second security image as detected from FIG. 20.

For instance FIG. 18 shows the original image to be secured, in this case an etching of a self portrait of Rembrandt. FIG. 19 shows a tiger's head which has been used as a security image. FIG. 20 shows the image of FIG. 18 to which a SABIC code image, that means an edited security image that can be added to an original image, has been added, here the tiger's head of FIG. 19. FIG. 21 shows the tiger's head as it can be detected from FIG. 20. Preferably this takes place by scanning FIG. 20 with a scanner, and editing the electronic image by means of the computer and software.

Figure 22:
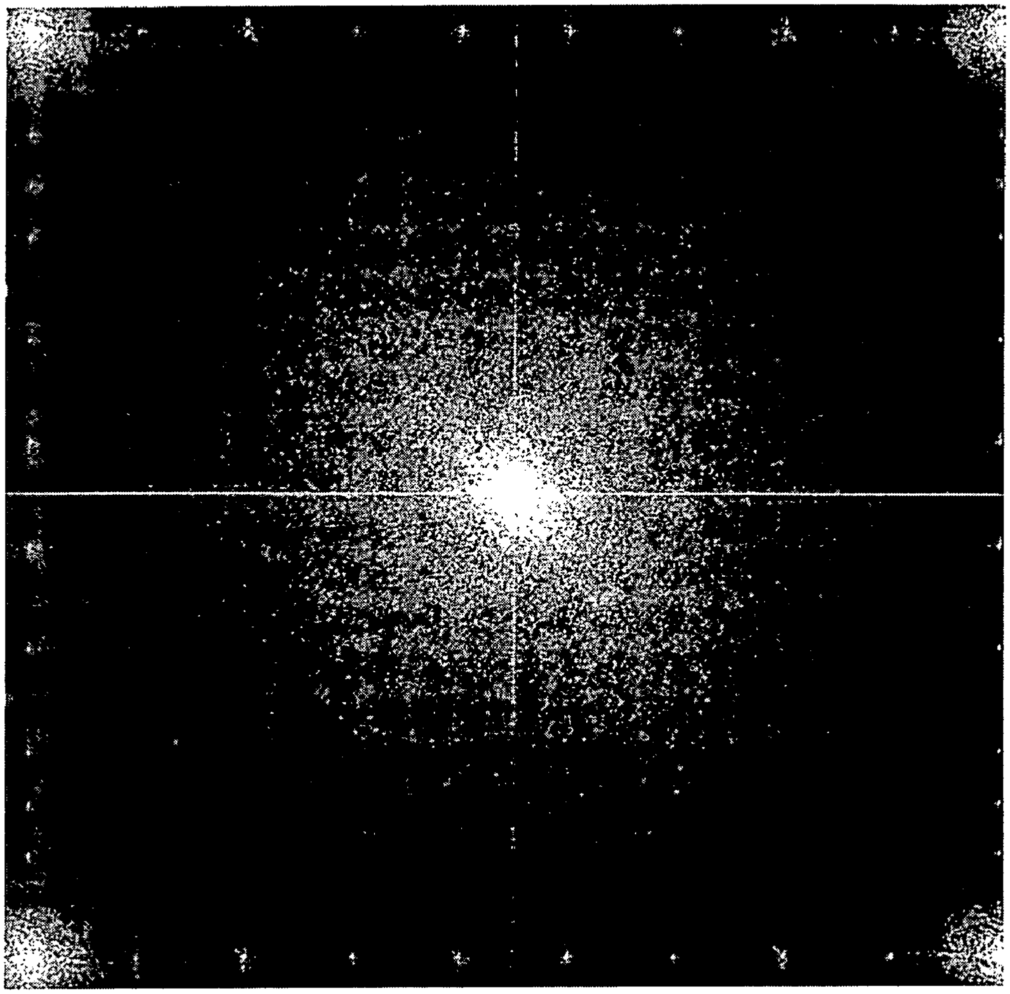
FIG. 22 shows the Fourier transformed (amplitude plot) of FIG. 20.

FIG. 22 shows the amplitude spectrum of the Fourier transformed of FIG. 21. Centrally the frequencies of the original image, FIG. 18, and in the angles the mirrored frequencies of FIG. 19 can be seen.

Figure 23:
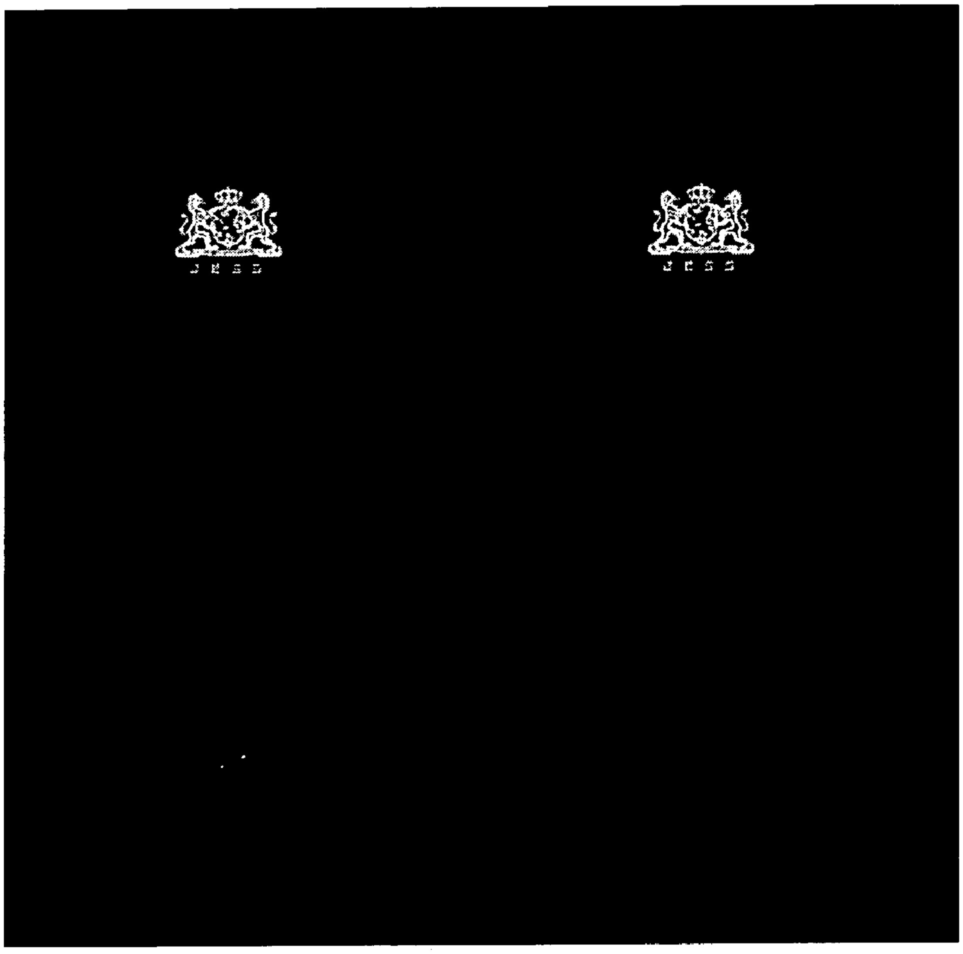
FIG. 23 shows a first security image.
Figure 24:
FIG. 24 shows FIG. 18 provided with a first and second security image.

FIG. 23 shows a first security image that can be added to FIG. 18. Said image is selected as Fourier amplitude spectrum and is added to the Fourier amplitude spectrum of FIG. 20. In FIG. 24 the result of this addition sum in the spatial domain can be seen: The original image of FIG. 18 with in the Fourier amplitude domain FIG. 23 and the transformed of FIG. 19 added.

Figure 25:
FIG. 25 shows a second security image as detected from FIG. 24.

In FIG. 25 the detected (SABIC) image from FIG. 24 can then be seen. Through the various filterings and transformations many details have been lost, but the image as such is still clearly detectable.

Figure 26:
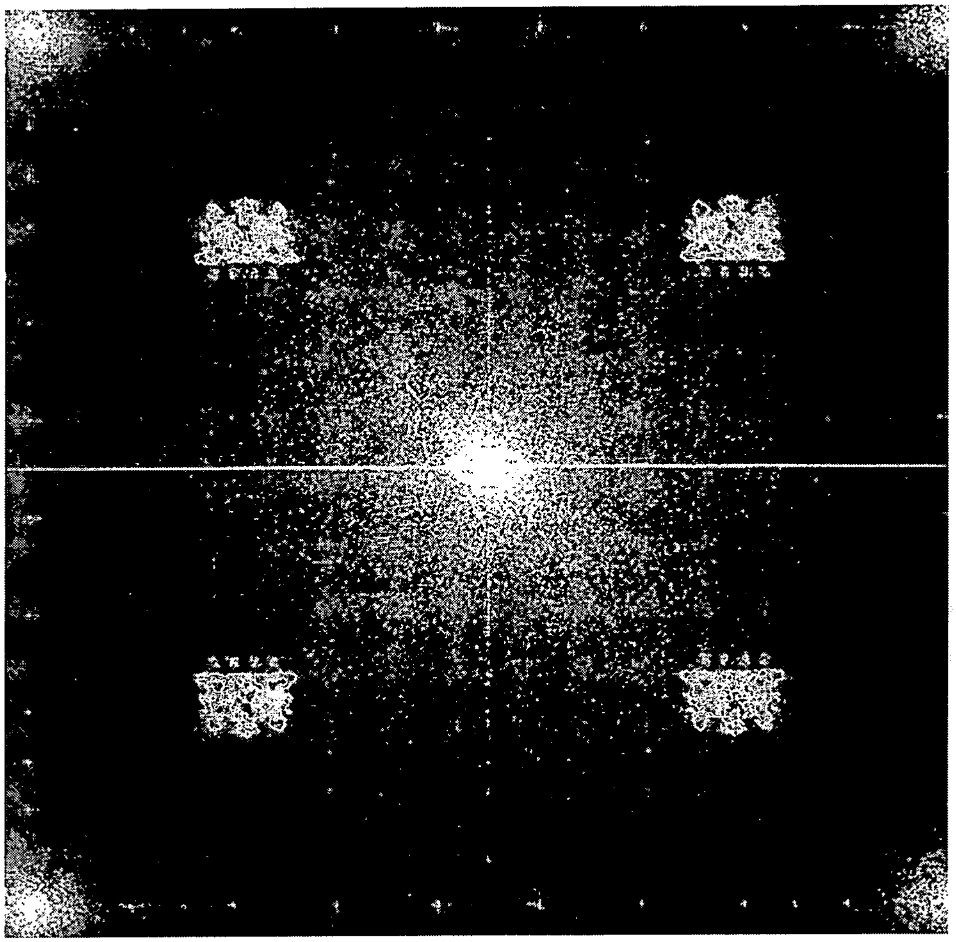
FIG. 26 shows the Fourier transformed (amplitude plot) of FIG. 24.

FIG. 26 is the (FFT) Fourier transformed of FIG. 24.

Figure 27A:
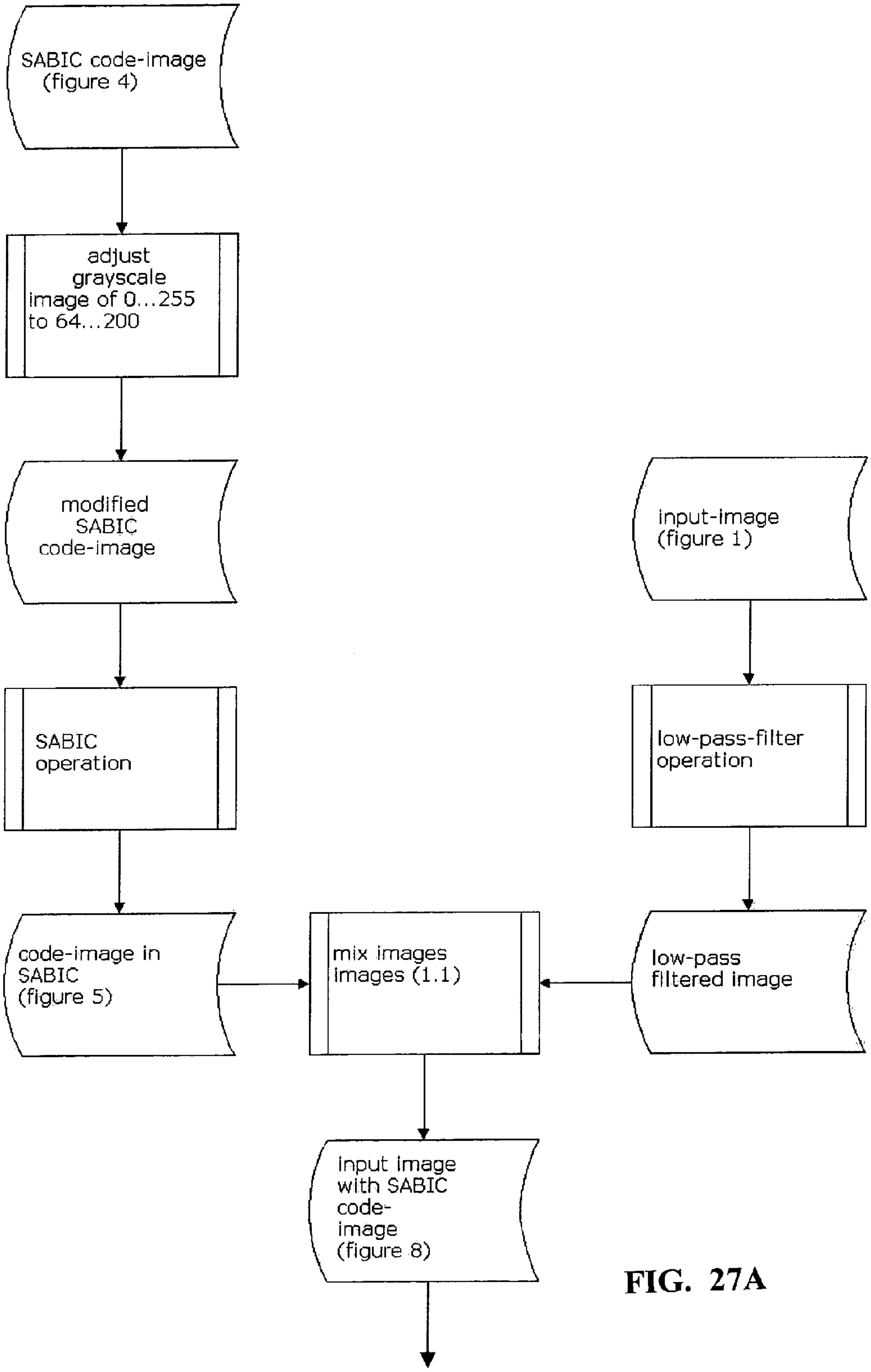
FIGS. 27A and 27B show a flow chart of the creation of an image provided with two security characteristics according to the invention.
Figure 27B:
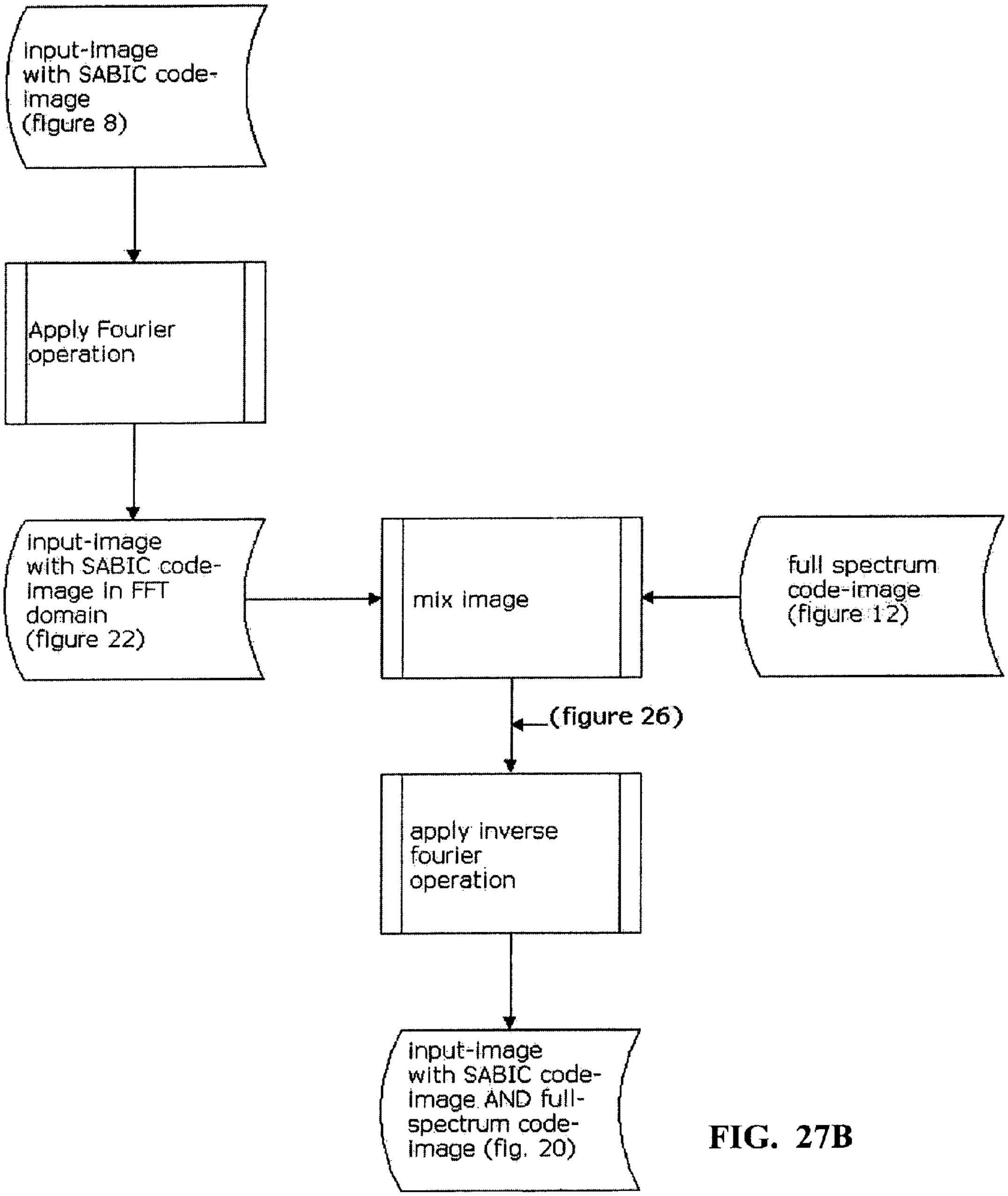

FIGS. 27A and 27B show the flow chart of the creation of a security image according to the invention, as for instance implemented in computer software. The flow chart continues on two pages. First a security image is arranged in accordance with the SABIC principle as described in EP-A-328 173. A second security image is added to the image thus obtained by adding an image in the Fourier amplitude domain, and subsequently inverse Fourier transformation.

According to the flow chart a grayscale image is first provided as second security characteristic image. Of the grayscale image, the grayscale is subsequently reduced from a grayscale between 0–255 to values of 64–200. The dynamic range is thus reduced. After that the operation known under the name SABIC is used. That means that first the Fourier transformed is calculated. After that a low-pass filter is used on the amplitude spectrum as a result of which the high amplitudes are filtered away. After that the remaining amplitudes are converted into higher values by a reversible transformation, preferably the values are mirrored in each quadrant, resulting in the amplitude indication of FIG. 10. The amplitudes of FIG. 10 are transformed back with the original phases by means of inverse Fourier transformation. To an image to be secured or an image that is used for security element first a low-pass filter is applied. To the resulting image, preferably 1 on 1, the first image, obtained by means of the SABIC method, is added. In this way the image is provided with a security characteristic that according to the invention is indicated as the second security image.

The resulting image with second security characteristic is then transformed by means of a Fourier transformation, after which an image, for instance FIG. 12, is added to the amplitude image. Subsequently an inverse Fourier transformation is applied. In this way the image is additionally provided with the first security characteristic according to the invention.

The described procedure can of course also be applied to one or more, if so desired several, colours from which a colour image has been built up.

Figure 28:
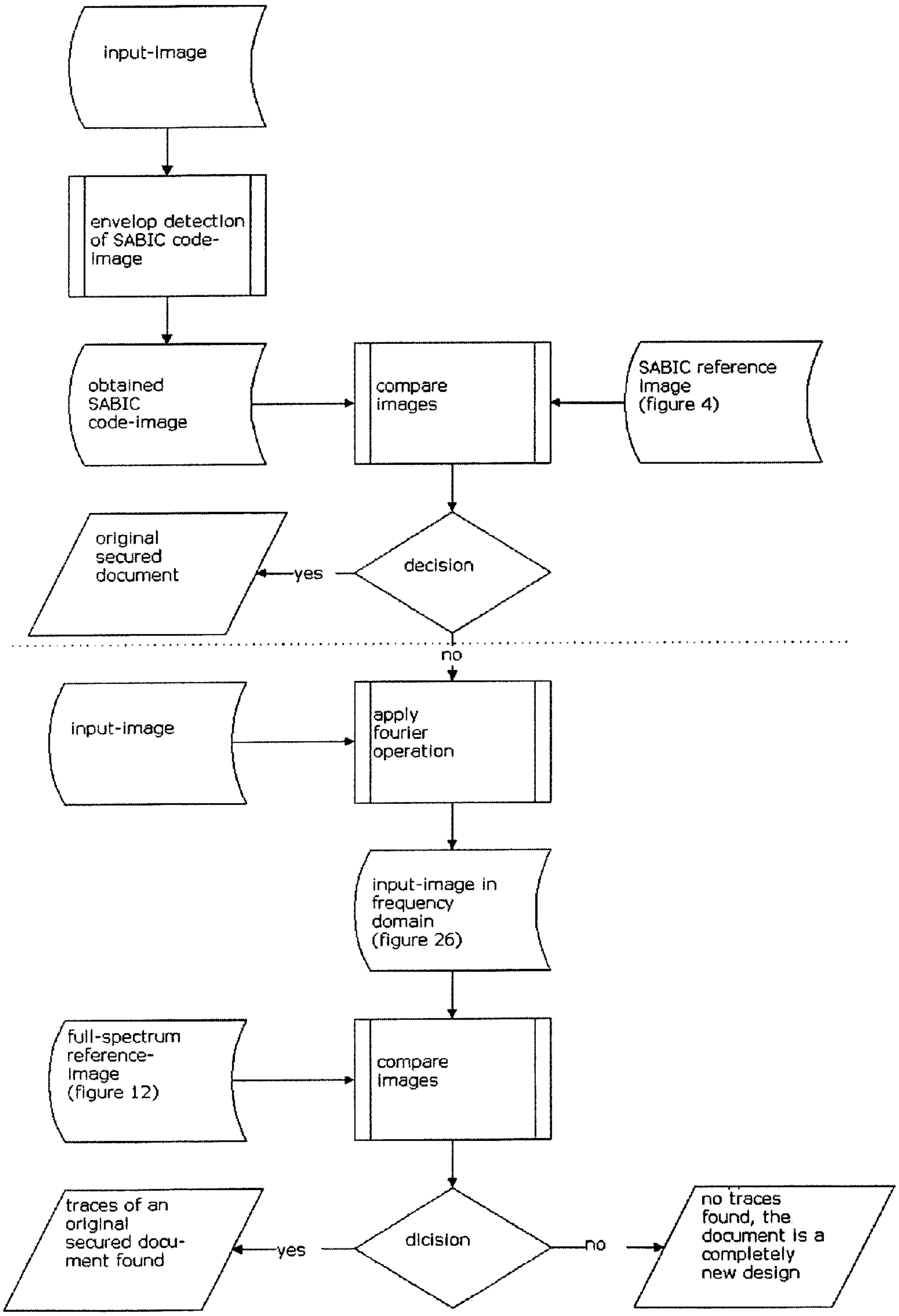
FIG. 28 shows a flow chart of the detection and processing.

In FIG. 28 an implementation of the detection of the various security levels is indicated in a flow chart. Said detection is preferably implemented in computer software. It can clearly be seen here that in one verification-go it can both be indicated whether the document is authentic, a first copy of an authentic document, or a complete forgery. As input image for instance a secured image obtained according to the method of FIG. 27 is used. First of all "envelop detection" is used on the input image. From this the second security characteristic can be obtained. The image is compared to the image that would originally have been added as second security element. The software has been provided with a decision algorithm from which an indication follows whether the input consists of an original.

Subsequently a Fourier transformation is applied on the input image. The amplitude image is subsequently compared to an image which has been added to an image as first security characteristic, and by means of a decision algorithm follows an indication whether the input image is based on an original, authentic image, that means whether it can be a copy of an authentic image.

It is of course also possible that the document as described above is label or the like arranged on an object. Additionally for instance a compact disc or other information carrier can be provided with a secured image according to the invention in digital form.

I claim:

1. In a document having a digital security image on or in the carrier, the improvements of the digital security image comprising:

at least a first and second security characteristic visually almost imperceptibly incorporated in the digital security image, wherein the first security characteristic is detectably copied onto a copy when copying the document and the second security characteristic is not copied onto the copy when copying the document, a resolution of the first security characteristic being higher than 100 dpi and a resolution of the second security characteristic being higher than the resolution of the first security characteristic.

2. The document according to claim 1, in which the resolution of the first and second security characteristics is higher than the resolving power of the human eye.

3. The document according to claim 1, in which the first and second security characteristics have been added to the Fourier amplitude spectrum of the digital security image.

4. The document according to claim 3, in which the first security characteristic has been added to a first frequency range of the Fourier amplitude spectrum of die digital security image, and a second security characteristic to a second frequency range of the Fourier spectrum of the digital security image.

5. The document according to claim 4, in which a Fourier amplitude spectrum of the second security characteristic has been added to the Fourier amplitude spectrum of the digital security image, and a Fourier phase spectrum of the second security characteristic has been added to the Fourier phase spectrum of the digital security image.

6. The document according to claim 3, in which a Fourier amplitude spectrum of the second security characteristic has been added to the Fourier amplitude spectrum of the digital security image, and Fourier phase spectrum of the second security characteristic has been added to the Fourier phase spectrum of the digital security image.

7. The document according to claim 1, in which the digital security image is a colour image.

8. The document according to claim 7, in which the security characteristics have been incorporated in at least one colour component of the digital security image.

9. The document according to claim 8, in which the security characteristics have been incorporated in the same colour component.

10. The document according to claim 1, in which a first security characteristic has been incorporated in a frequency range of the Fourier amplitude spectrum which has a resolution of approximately 150–600 dpi in the spatial domain and a second security characteristic in a frequency range of the Fourier amplitude spectrum which has a resolution higher than the resolution of the first security characteristic in the spatial domain.

11. In a document having a digital security image provided with at least a first and a second security characteristic at substantially the same position on or in the document, the improvements wherein the first security characteristic and the second security characteristic have a frequency that is higher than visually perceptible to the human eye, the first security characteristic in the Fourier frequency domain has a frequency that is lower than the highest of print and scan resolution of copying equipment and the second security characteristic in the Fourier frequency domain has a frequency of at least twice the highest of the print and scan resolution of copying equipment.

12. In a document having a digital security image provided with at least a first and a second security characteristic at substantially the same position on or in the document, the improvements wherein the first security characteristic in the Fourier domain is in a range which has a frequency of between 150 and 400 dpi in the spatial domain, and the second security characteristic in the Fourier frequency domain is in a range which has a resolution that is higher than 400 dpi in the spatial domain.

13. The document according to claim 12, in which the first and second security characteristics have been incorporated in the amplitude spectrum of the Fourier frequency domain.

14. The document according to claim 12, in which the first security characteristic in the Fourier domain is in a range which has a frequency between 250 and 400 dpi.

15. The document according to claim 12, in which the second security characteristic in the Fourier domain is in a range which has a resolution higher than 800 dpi.

16. In a document having a digital security image provided with a secured image, the improvements wherein the amplitude spectrum of the Fourier transform of the secured image is an addition sum of the amplitude spectrum of the Fourier transform of the digital security image, a first image having frequencies in the amplitude spectrum which have a resolution higher than 150 dpi in the spatial domain and the transformed of the amplitude spectrum of the Fourier transform of a second image having frequencies in the amplitude spectrum which have a resolution in the spatial domain that is higher than the resolutions of the first image.

17. The document according to claim 16, in which the transformation is a low-pass filter followed by a transformation which converts the low frequencies into frequencies above a threshold value, the transformations being carried out in the Fourier frequency domain.

18. A method for arranging security elements on a carrier, particularly a document, in which a first security characteristic with a resolution higher than 100 dpi and a second security characteristic with a resolution higher than the resolution of the first security characteristic and higher than a display device is arranged in an original image for obtaining a security image, after which the security image is arranged on the carrier as security characteristic.

19. A method according to claim 18, in which the digital security image is converted into a representation that is computer-processable, and software loaded in a computer memory applies a high-passage filter operation and a diode function operation on the representation, compares the result with the computer-processable representation of a first security image, calculates the Fourier transformed of the representation, and compares the amplitude spectrum to a second security image.

20. A device for detecting a digital security image in or on a carrier, the device comprising a recording device for recording a recorded image of the carrier in computer-processable form, a computer, and means for transmitting the recorded image from the recording device to the computer, wherein the computer has a memory, software for locating the digital security image in the recorded image, a calculating unit for calculating the Fourier transform of the digital security image in the memory, and display means for displaying an assessment of the authenticity of the carrier, wherein the digital security image in or on the carrier comprises a first security characteristic with a resolution higher than 100 dpi and a second security characteristic with a resolution higher than the resolution of the first security characteristic, and the software further comprises a detection unit for detecting the first security characteristic and the second security characteristic in the digital security image.

21. A computer-readable storage medium holding a digital security image in a computer-procesable form which, when reproduced on a document, comprises at least a first and second security characteristic visually almost imperceptibly incorporated in the reproduced digital security image, wherein the first security characteristic is detectably copied on a copy when copying the document and the second security characteristic is not copied onto said copy when copying the document, the first security characteristic having a resolution higher than 100 dpi and the second security characteristic having a resolution higher than the resolution of the first security characteristic.

22. A computer-readable storage medium provided with software which, when running on a computer provided with a memory with an original digital image, instructs said computer to arrange a first and second security characteristic in the original digital in order to provide a security image which, when applied onto or in a substrate, has the first security characteristic with a resolution higher than 100 dpi and the second security characteristic with a resolution higher than the resolution of the first security characteristic.

23. A computer-readable storage medium provided with software which, when running on a computer provided with a memory with a security image which, when applied onto or in a substrate, has a first security characteristic with a resolution higher than 100 dpi and a second security characteristic with a resolution higher than the resolution of the first security characteristic, instructs the computer to detect the first and second security characteristic in the digital security image.

* * * * *